United States Patent
DiGiovanni

(10) Patent No.: US 9,103,174 B2
(45) Date of Patent: Aug. 11, 2015

(54) CUTTING ELEMENTS FOR EARTH-BORING TOOLS, EARTH-BORING TOOLS INCLUDING SUCH CUTTING ELEMENTS AND RELATED METHODS

(75) Inventor: Anthony A. DiGiovanni, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 389 days.

(21) Appl. No.: 13/609,575

(22) Filed: Sep. 11, 2012

(65) Prior Publication Data

US 2013/0068537 A1 Mar. 21, 2013

Related U.S. Application Data

(60) Provisional application No. 61/535,772, filed on Sep. 16, 2011.

(51) Int. Cl.
*E21B 10/567* (2006.01)
*E21B 10/55* (2006.01)
*B24D 99/00* (2010.01)
*E21B 10/573* (2006.01)

(52) U.S. Cl.
CPC .......... *E21B 10/5676* (2013.01); *B24D 99/005* (2013.01); *E21B 10/55* (2013.01); *E21B 10/5673* (2013.01); *E21B 10/5735* (2013.01)

(58) Field of Classification Search
CPC ..................... E21B 10/5676; E21B 10/5673
USPC ................. 175/420.2, 426, 430, 434, 432
See application file for complete search history.

(56) References Cited

U.S. PATENT DOCUMENTS

| | | |
|---|---|---|
| 4,224,380 A | 9/1980 | Bovenkerk et al. |
| 4,538,690 A | 9/1985 | Short |
| 4,539,018 A | 9/1985 | Whanger |
| 4,558,753 A | 12/1985 | Barr |
| 4,593,777 A | 6/1986 | Barr |
| 4,629,373 A | 12/1986 | Hall |
| 4,858,707 A | 8/1989 | Jones et al. |
| 4,872,520 A | 10/1989 | Nelson |

(Continued)

FOREIGN PATENT DOCUMENTS

| | | |
|---|---|---|
| CN | 2579580 Y | 10/2003 |
| CN | 201024900 Y | 2/2008 |

(Continued)

OTHER PUBLICATIONS

Bilen et al., U.S. Appl. No. 13/461,388 entitled Earth-Boring Tools Having Cutting Elements with Cutting Faces Exhibiting Multiple Coefficients of Friction, and Related Methods, filed May 1, 2012.

(Continued)

*Primary Examiner* — Shane Bomar
*Assistant Examiner* — Kipp Wallace
(74) *Attorney, Agent, or Firm* — TraskBritt

(57) ABSTRACT

Cutting elements include a superabrasive table, at least one indentation in a cutting face of the superabrasive table, and at least one spoke extending radially across at least a portion of the at least one indentation. Earth-boring drill bits include such a cutting element. Methods of forming a cutting element include forming a superabrasive table having at least one such indentation and at least one such spoke, and positioning the superabrasive table on a substrate.

20 Claims, 7 Drawing Sheets

(56) References Cited

U.S. PATENT DOCUMENTS

| | | | |
|---|---|---|---|
| 4,984,642 A | 1/1991 | Renard et al. | |
| 4,997,049 A | 3/1991 | Tank et al. | |
| 5,007,207 A | 4/1991 | Phaal et al. | |
| 5,054,246 A | 10/1991 | Phaal et al. | |
| 5,078,219 A | 1/1992 | Morrell et al. | |
| 5,127,923 A | 7/1992 | Bunting et al. | |
| 5,333,699 A | 8/1994 | Thigpen | |
| 5,351,772 A | 10/1994 | Smith | |
| 5,355,969 A | 10/1994 | Hardy et al. | |
| 5,377,773 A | 1/1995 | Tibbitts | |
| 5,437,343 A | 8/1995 | Cooley et al. | |
| 5,447,208 A | 9/1995 | Lund et al. | |
| 5,449,048 A | 9/1995 | Thigpen et al. | |
| 5,533,582 A | 7/1996 | Tibbitts | |
| 5,549,171 A | 8/1996 | Mensa et al. | |
| 5,569,000 A | 10/1996 | Littecke et al. | |
| 5,607,024 A | 3/1997 | Keith | |
| 5,653,300 A | 8/1997 | Lund et al. | |
| 5,984,005 A | 11/1999 | Hart et al. | |
| 6,006,846 A * | 12/1999 | Tibbitts et al. | 175/428 |
| 6,045,440 A | 4/2000 | Johnson et al. | |
| 6,059,054 A | 5/2000 | Portwood et al. | |
| 6,065,554 A | 5/2000 | Taylor et al. | |
| 6,068,071 A | 5/2000 | Jurewicz et al. | |
| 6,145,608 A | 11/2000 | Lund et al. | |
| 6,164,394 A | 12/2000 | Mensa-Wilmot et al. | |
| 6,196,340 B1 | 3/2001 | Jensen et al. | |
| 6,196,910 B1 | 3/2001 | Johnson et al. | |
| 6,202,771 B1 | 3/2001 | Scott et al. | |
| 6,220,376 B1 | 4/2001 | Lundell | |
| 6,328,117 B1 | 12/2001 | Berzas et al. | |
| 6,524,363 B2 | 2/2003 | Gates, Jr. et al. | |
| 6,527,065 B1 | 3/2003 | Tibbitts et al. | |
| 6,550,556 B2 | 4/2003 | Middlemiss et al. | |
| 6,935,444 B2 | 8/2005 | Lund et al. | |
| 6,962,218 B2 * | 11/2005 | Eyre | 175/432 |
| 7,000,715 B2 | 2/2006 | Sinor et al. | |
| 7,363,992 B2 | 4/2008 | Stowe et al. | |
| 7,373,998 B2 | 5/2008 | Cariveau et al. | |
| 7,533,740 B2 | 5/2009 | Zhang et al. | |
| 7,740,090 B2 | 6/2010 | Shen et al. | |
| 8,016,054 B2 | 9/2011 | Lancaster et al. | |
| 8,191,656 B2 | 6/2012 | Dourfaye et al. | |
| 8,210,288 B2 | 7/2012 | Chen et al. | |
| 8,684,112 B2 | 4/2014 | DiGiovanni et al. | |
| D712,941 S | 9/2014 | Mo | |
| 8,833,492 B2 | 9/2014 | Durairajan et al. | |
| 2004/0009376 A1 | 1/2004 | Wan et al. | |
| 2005/0247492 A1 | 11/2005 | Shen et al. | |
| 2005/0269139 A1 | 12/2005 | Shen et al. | |
| 2007/0235230 A1 | 10/2007 | Cuillier et al. | |
| 2008/0006448 A1 | 1/2008 | Zhang et al. | |
| 2008/0264696 A1 | 10/2008 | Dourfaye et al. | |
| 2008/0308321 A1 | 12/2008 | Aliko et al. | |
| 2009/0114628 A1 | 5/2009 | DiGiovanni | |
| 2010/0084198 A1 | 4/2010 | Durairajan et al. | |
| 2010/0276200 A1 | 11/2010 | Schwefe et al. | |
| 2011/0031030 A1 | 2/2011 | Shen et al. | |
| 2011/0171414 A1 | 7/2011 | Sreshta et al. | |
| 2011/0259642 A1 | 10/2011 | DiGiovanni et al. | |
| 2012/0205162 A1 | 8/2012 | Patel et al. | |
| 2013/0068534 A1 | 3/2013 | DiGiovanni et al. | |
| 2013/0068538 A1 | 3/2013 | DiGiovanni et al. | |
| 2013/0292188 A1 | 11/2013 | Bilen et al. | |
| 2014/0238753 A1 | 8/2014 | Nelms et al. | |
| 2014/0246253 A1 | 9/2014 | Patel et al. | |

FOREIGN PATENT DOCUMENTS

| | | |
|---|---|---|
| EP | 546725 A1 | 9/1996 |
| EP | 835981 A2 | 4/1998 |
| EP | 979699 A1 | 2/2000 |
| WO | 9415058 A1 | 7/1994 |
| WO | 9427769 A1 | 12/1994 |
| WO | 0048789 A1 | 8/2000 |
| WO | 0160554 A1 | 8/2001 |
| WO | 2008006010 A3 | 5/2008 |

OTHER PUBLICATIONS

Patel et al., U.S. Appl. No. 13/840,195 entitled Cutting Elements for Earth-Boring Tools, Earth-Boring Tools Including Such Cutting Elements, and Related Methods, filed Mar. 15, 2013.

International Search Report for International Application No. PCT/US2012/054999 dated Jan. 31, 2013, 3 pages.

Guilin Color Engineered Diamond Technology (EDT) Co. Ltd., Brochure, Offshore Technology Conference Apr. 30-May 3, 2012.

Guilin Star Diamond Superhard Material Co. Ltd., Brochure, Offshore Technology Conference Apr. 30-May 3, 2012.

Pilkey in Peterson'S Stress Concentration Factors (2d ed., Wiley Interscience 1997), in Section 2.6.6, on p. 71 (1997).

International Preliminary Report on Patentability for International Application No. PCT/US2012/054999 dated Mar. 18, 2014, 6 pages.

International Written Opinion for International Application No. PCT/US2012/054999 dated Jan. 31, 2013, 5 pages.

Patel et al., U.S. Appl. No. 14/480,293 entitled, Multi-Chamfer Cutting Elements Having a Shaped Cutting Face, Earth-Boring Tools Including Such Cutting Elements, and Related Methods, filed Sep. 8, 2014.

* cited by examiner

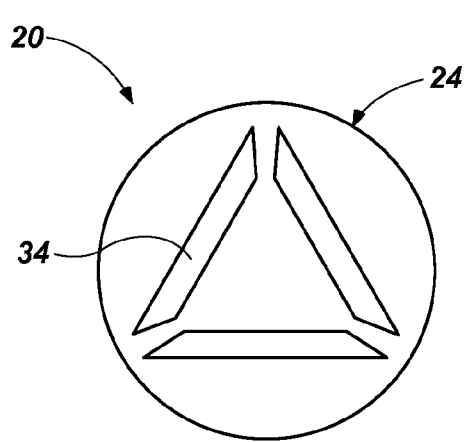
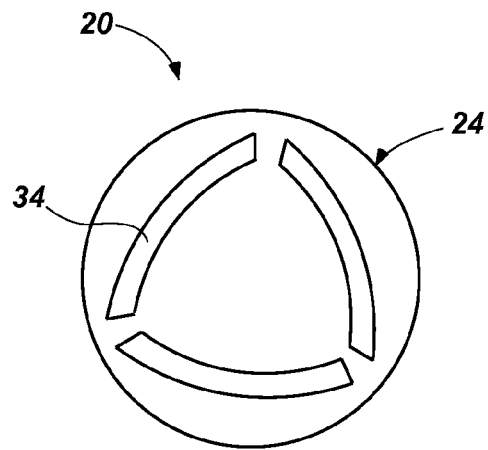
FIG. 12    FIG. 13
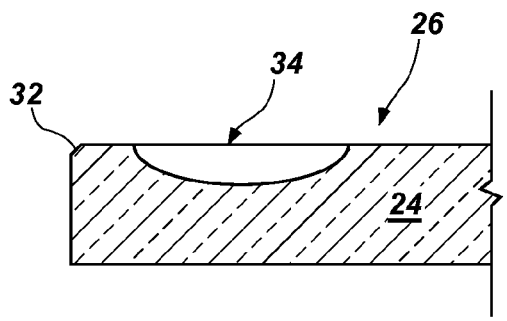
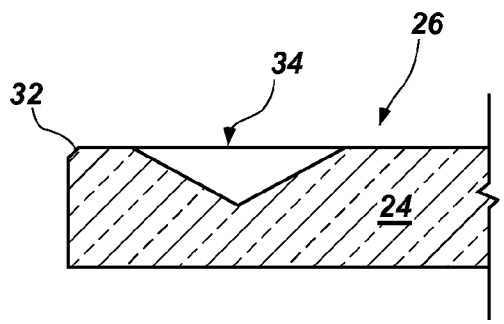
FIG. 14    FIG. 15
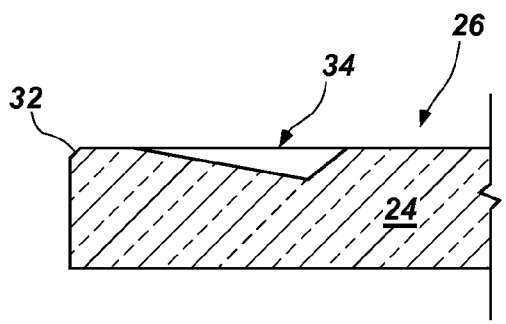
FIG. 16

CUTTING ELEMENTS FOR EARTH-BORING TOOLS, EARTH-BORING TOOLS INCLUDING SUCH CUTTING ELEMENTS AND RELATED METHODS

CROSS-REFERENCE TO RELATED APPLICATIONS

This application claims the benefit of U.S. Provisional Patent Application Ser. No. 61/535,772, filed Sep. 16, 2011, the disclosure of which is hereby incorporated herein in its entirety by this reference. The subject matter of this application is related to the subject matter of U.S. patent application Ser. No. 13/092,396, filed Apr. 22, 2011, now U.S. Pat. No. 8,684,112 issued Apr. 1, 2014, U.S. patent application Ser. No. 13/472,377, filed May 15, 2012, and U.S. patent application Ser. No. 13/477,905, filed May 22, 2012, the disclosures of each of which are hereby incorporated herein in their entirety by this reference.

TECHNICAL FIELD

Embodiments of the present invention relate to earth-boring tools, cutting elements for such earth-boring tools, and related methods.

BACKGROUND

Wellbores are formed in subterranean formations for various purposes including, for example, extraction of oil and gas from the subterranean formation and extraction of geothermal heat from the subterranean formation. Wellbores may be formed in a subterranean formation using a drill bit, such as, for example, an earth-boring rotary drill bit. Different types of earth-boring rotary drill bits are known in the art including, for example, fixed-cutter bits (which are often referred to in the art as "drag" bits), rolling-cutter bits (which are often referred to in the art as "rock" bits), diamond-impregnated bits, and hybrid bits (which may include, for example, both fixed cutters and rolling cutters). During operation, the drill bit is rotated and advanced into the subterranean formation. As the drill bit rotates, the cutters or abrasive structures thereof cut, crush, shear, and/or abrade away the formation material to form the wellbore. A diameter of the wellbore drilled by the drill bit may be defined by the cutting structures disposed at the largest outer diameter of the drill bit.

The drill bit is coupled, either directly or indirectly, to an end of what is referred to in the art as a "drill string," which comprises a series of elongated tubular segments connected end-to-end that extends into the wellbore from the surface of the formation. Often, various tools and components, including the drill bit, may be coupled together at the distal end of the drill string at the bottom of the wellbore being drilled. This assembly of tools and components is referred to in the art as a "bottom-hole assembly" (BHA).

The drill bit may be rotated within the wellbore by rotating the drill string from the surface of the formation, or the drill bit may be rotated by coupling the drill bit to a downhole motor, which is also coupled to the drill string and disposed proximate the bottom of the wellbore. The downhole motor may comprise, for example, a hydraulic Moineau-type motor having a shaft, to which the drill bit is mounted, that may be caused to rotate by pumping fluid (e.g., drilling mud or fluid) from the surface of the formation down through the center of the drill string, through the hydraulic motor, out from nozzles in the drill bit, and back up to the surface of the formation through an annular space between the outer surface of the drill string and the exposed surface of the formation within the wellbore.

BRIEF SUMMARY

In some embodiments, a cutting element for an earth-boring tool may include a superabrasive table having at least one indentation in a cutting face thereof and at least one spoke extending radially across at least a portion of the at least one indentation. The superabrasive table may be positioned on a substrate.

In further embodiments, an earth-boring tool may comprise at least one cutting element. The at least one cutting element may include a superabrasive table positioned on a substrate, the superabrasive table having at least one indentation in a cutting face thereof, and at least one spoke extending radially across at least a portion of the at least one indentation.

Other embodiments comprise methods of forming cutting elements. In accordance with such methods, a superabrasive table may be formed. The superabrasive table may have a cutting face, at least one indentation in the cutting face, and at least one spoke extending radially across at least a portion of the at least one indentation. The superabrasive table may be positioned on a substrate.

BRIEF DESCRIPTION OF THE DRAWINGS

While the specification concludes with claims particularly pointing out and distinctly claiming what are regarded as embodiments of the present invention, various features and advantages of this invention may be more readily ascertained from the following description of example embodiments of the invention provided with reference to the accompanying drawings.

FIG. 12 is a plan view of a cutting element showing a cutting face having an indentation extending along a path configured as a polygon, according to an embodiment of the present disclosure.

FIG. 13 is a plan view of a cutting element showing a cutting face having an indentation extending along a path configured as a Reuleaux polygon, according to an embodiment of the present disclosure.

FIG. 14 is a cross-sectional view of a portion of a superabrasive table of a cutting element having an indentation with a cross-sectional shape generally defined as an elliptical arc, according to an embodiment of the present disclosure.

FIG. 15 is a cross-sectional view of a portion of a superabrasive table of a cutting element having an indentation with a cross-sectional shape generally defined as a symmetric V-shape, according to an embodiment of the present disclosure.

FIG. 16 is a cross-sectional view of a portion of a superabrasive table of a cutting element having an indentation with a cross-sectional shape generally defined as an asymmetric V-shape, according to an embodiment of the present disclosure.

DETAILED DESCRIPTION OF THE INVENTION

The illustrations presented herein are not actual views of any particular earth-boring tool, drill bit, or component of such a tool or bit, but are merely idealized representations which are employed to describe embodiments of the present invention.

As used herein, the phrase "earth-boring tool" means and includes any tool used to remove formation material and form a bore (e.g., a wellbore) through the formation by way of the removal of the formation material. Earth-boring tools include, for example, rotary drill bits (e.g., fixed-cutter or "drag" bits, roller cone or "rock" bits, etc.), hybrid bits including both fixed cutters and roller elements, coring bits, percussion bits, bi-center bits, reamers (e.g., expandable reamers, fixed-wing reamers, etc.), and other so-called "hole-opening" tools.

As used herein, the phrase "cutting element" means and includes any element of an earth-boring tool that is used to cut or otherwise disintegrate formation material when the earth-boring tool is used to form or enlarge a bore in the formation.

Figure 1:
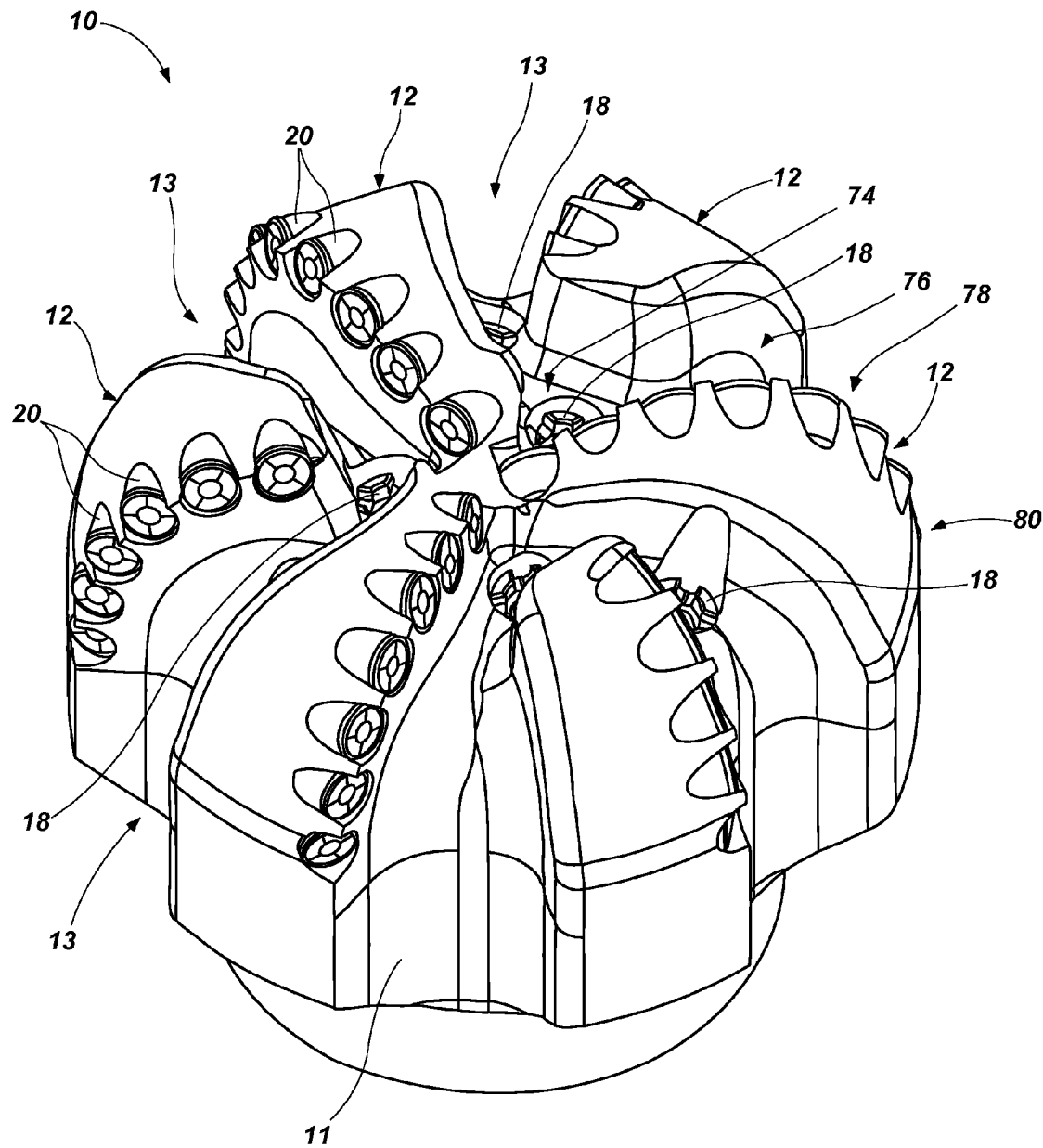
FIG. 1 is a perspective view of an earth-boring drill bit including cutting elements, according to an embodiment of the present invention.

FIG. 1 illustrates an embodiment of an earth-boring tool of the present disclosure. The earth-boring tool of FIG. 1 is a fixed-cutter rotary drill bit 10 having a bit body 11 that includes a plurality of blades 12 that project outwardly from the bit body 11 and are separated from one another by fluid courses 13. The portions of the fluid courses 13 that extend along the radial sides (the "gage" areas of the drill bit 10) are often referred to in the art as "junk slots." The bit body 11 further includes a generally cylindrical internal fluid plenum, and fluid passageways that extend through the bit body 11 to the exterior surface of the bit body 11. Nozzles 18 may be secured within the fluid passageways proximate the exterior surface of the bit body 11 for controlling the hydraulics of the drill bit 10 during drilling. A plurality of cutting elements 20 is mounted to each of the blades 12.

During a drilling operation, the drill bit 10 may be coupled to a drill string (not shown). As the drill bit 10 is rotated within the wellbore, drilling fluid may be pumped down the drill string, through the internal fluid plenum and fluid passageways within the bit body 11 of the drill bit 10, and out from the drill bit 10 through the nozzles 18. Formation cuttings generated by the cutting elements 20 of the drill bit 10 may be carried with the drilling fluid through the fluid courses 13, around the drill bit 10, and back up the wellbore through the annular space within the wellbore outside the drill string.

Figure 2:
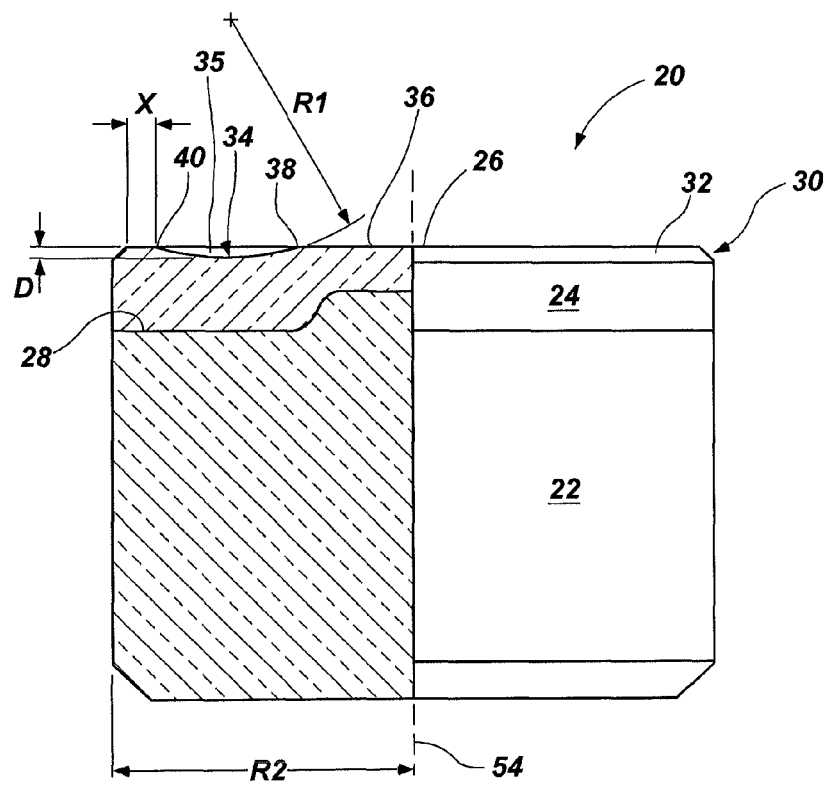
FIG. 2 is a partially cut-away side view of a cutting element having an indentation in a cutting face, according to an embodiment of the present disclosure.

FIG. 2 is a side view of a partially cut-away of cutting element 20 of the drill bit 10 of FIG. 1. The cutting element 20 includes a cutting element substrate 22 having a diamond table 24 thereon. The diamond table 24 may comprise a polycrystalline superabrasive material, such as, for example, a polycrystalline diamond (PCD) material, having a cutting face 26 defined thereon. Superabrasive materials may also be characterized as "superhard" materials and include natural and synthetic diamond, cubic boron nitride and diamond-like carbon materials. Thus, although the cutting element 20 is described herein as including a diamond table 24, a table of any superabrasive material may be used for the diamond table 24. Additionally, an interface 28 may be defined between the cutting element substrate 22 and diamond table 24. Optionally, the diamond table 24 may have a chamfered edge 30. The chamfered edge 30 of the diamond table 24 shown in FIG. 2 has a single chamfer surface 32, although the chamfered edge 30 also may have additional chamfer surfaces, and such additional chamfer surfaces may be oriented at chamfer angles that differ from the chamfer angle of the chamfer surface 32, as known in the art. The cutting element substrate 22 may have a generally cylindrical shape, as shown in FIG. 2. One or more arcuate, or "radiused" edges or edge portions may be employed in lieu of, or in addition to, one or more chamfered surfaces at a peripheral edge of the diamond table 24, as known to those of ordinary skill in the art.

The diamond table 24 may be formed on the cutting element substrate 22, or the diamond table 24 and the cutting element substrate 22 may be separately formed and subsequently attached together. The cutting element substrate 22 may be formed from a material that is relatively hard and resistant to wear. For example, the cutting element substrate 22 may be formed from and include a ceramic-metal composite material (which is often referred to as a "cermet" material). The cutting element substrate 22 may include a cemented carbide material, such as a cemented tungsten carbide material, in which tungsten carbide particles are cemented together in a metallic binder material. The metallic binder material may include, for example, cobalt, nickel, iron, or alloys and mixtures thereof. In some instances, the cutting element substrate 22 may comprise two pieces, including a piece immediately supporting the diamond table 24, which may be formed and bonded to another, longer piece of like diameter. In any case, the cutting elements 20 may be secured in pockets on blades 12 as depicted in FIG. 1, such as by brazing.

Figure 3:
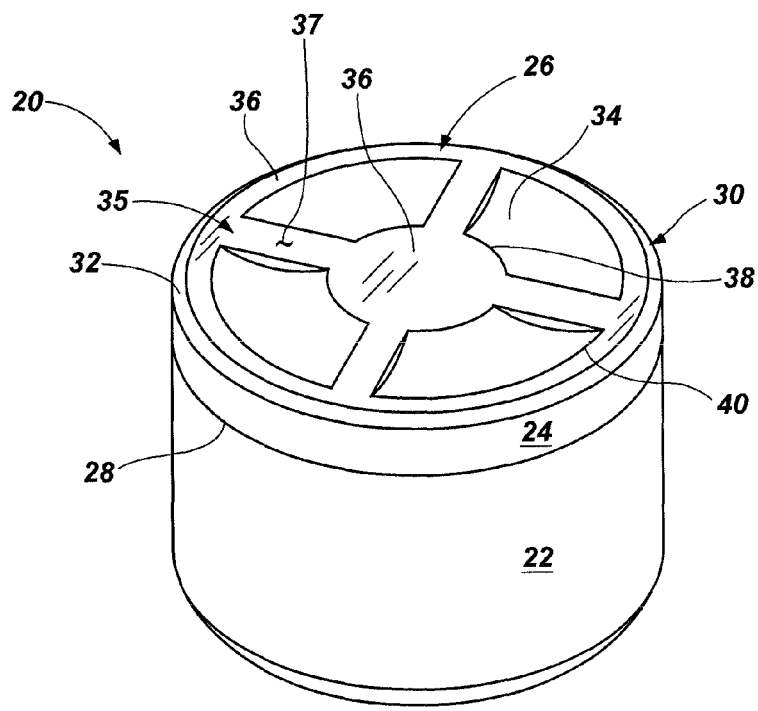
FIG. 3 is a perspective view of the cutting element of FIGS. 1 and 2.

At least one circumferentially extending indentation 34, which may be segmented by radially extending spokes 35 into a plurality of indentations 34, may be defined in the cutting face 26 of the cutting element 20. For example, a segmented, generally annular, indentation 34 of arcuate radial cross-section may be defined in the cutting face 26 of the cutting element 20, as shown in FIGS. 2 and 3, which may be divided into segments by the radially extending spokes 35. The plurality of indentations 34 may be positioned proximate to a peripheral edge of the cutting element 20, such as proximate to the chamfer surface 32, and may extend generally radially from proximate the peripheral edge to a central region of the cutting element 20 proximate a longitudinal central axis 54 of the cutting element 20. Each indentation 34 may be defined by an arcuate cross-section having a primary surface with a cross-sectional dimension defined by a radius R1. As a non-limiting example, each indentation 34 may be an arcuate groove defined by a radius R1 of about 0.25 inch (about 6.35 mm) and having a depth D of about 0.012 inch (about 0.30 mm) relative to substantially planar surfaces 36 of the cutting face 26. A radially outward edge 40 of each indentation 34 may be positioned a distance X of about 0.031 inch (about 0.79 mm) from the chamfer surface 32, and the chamfer edge 30 may have a width of about 0.010 inch (about 0.30 mm). The overall dimension of the cutting element 20 may be defined by a radius R2 of about 0.315 inch (about 8 mm). Of course, values of the dimensions of the identified features of the cutting element 20 may, in some embodiments, be larger or smaller than these example values, depending on an intended application of the cutting element 20, for example. Additionally, a radially inward edge 38 and the radially outward edge 40 of each indentation 34 (relative to the central axis 54) may be radiused, or otherwise smoothed, to provide a relatively smooth transition between each indentation 34 and substantially planar surfaces 36 of the cutting face 26 of the cutting element 20.

Figure 4:
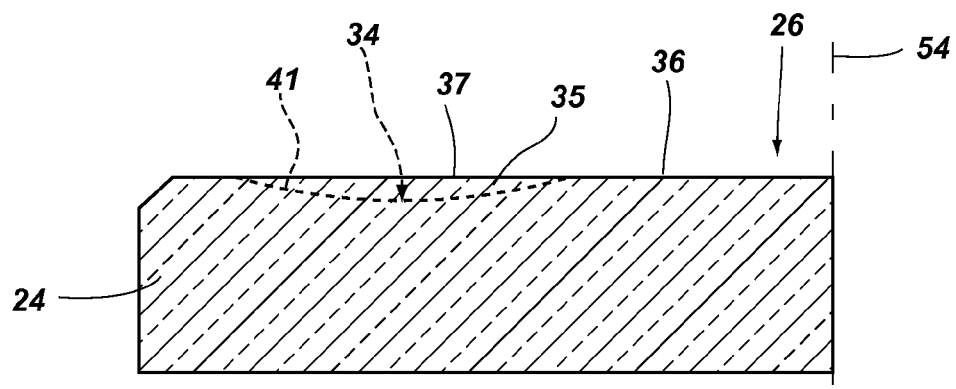
FIG. 4 is a partial cross-sectional view of a superabrasive table of the cutting element of FIGS. 1-3 showing a profile of a radial spoke relative to the indentation in the cutting face, according to an embodiment of the present disclosure.

The spokes 35 may be integral regions of the diamond table 24 and may be comprised of the same superabrasive material as the diamond table 24. Each spoke 35 may traverse at least a portion of the indentation 34 and, therefore, may extend at least partially between a central region of the diamond table 24 (i.e., a region at or proximate the central axis 54) and a periphery of the diamond table 24. As shown in FIG. 3, for example, each spoke 35 may traverse the entire indentation 34 and extend from the central region to the periphery of the diamond table 24. In other embodiments (e.g., FIGS. 5, 6, 9, and 11), each spoke 35 may traverse only a portion of the indentation 34, and, therefore, may not reach the periphery and/or the central region of the diamond table 24. In some embodiments, such as shown in FIGS. 3 and 4, each radially extending spoke 35 may comprise an upper surface 37 that may be substantially coplanar with the substantially planar surfaces 36 of the cutting face 26. As shown in FIG. 3, side surfaces of the spokes 35 proximate the indentation 34 may, in some embodiments, be generally planar and perpendicular to the upper surfaces 37 of the spokes 35. A dashed line 41 in FIGS. 4-6 indicates a cross-sectional profile of an indentation 34 relative to each radially extending spoke 35.

Figure 5:
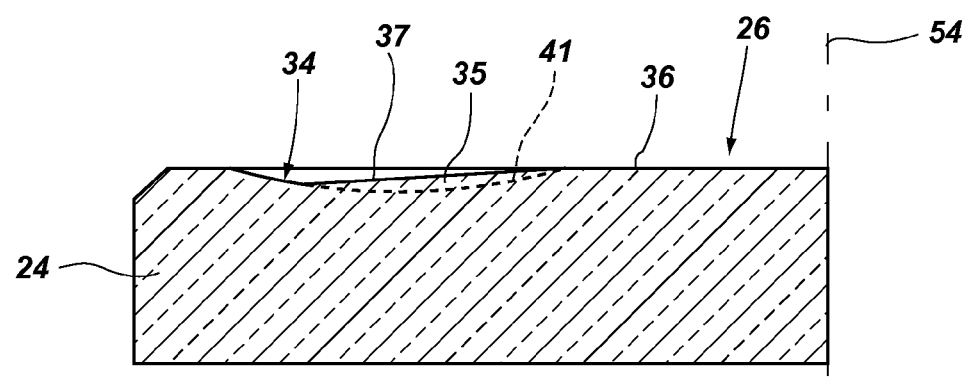
FIG. 5 is a partial cross-sectional view of a superabrasive table of a cutting element showing a profile of a radial spoke relative to an indentation in a cutting face of the cutting element, wherein the radial spoke inclines toward the cutting face in a direction radially toward an axis of the cutting element, according to an embodiment of the present disclosure.
Figure 6:
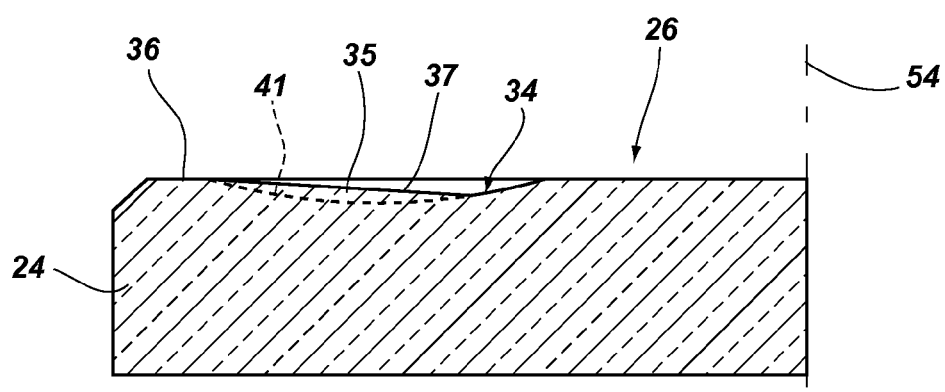
FIG. 6 is a partial cross-sectional view of a superabrasive table of a cutting element showing a profile of a radial spoke relative to an indentation in a cutting face of the cutting element, wherein the radial spoke inclines toward the cutting face in a direction radially away from an axis of the cutting element, according to an embodiment of the present disclosure.

In further embodiments, the upper surfaces 37 of the radially extending spokes 35 may be sloped or angled relative to the substantially planar surfaces 36 of the cutting face 26, as shown in FIGS. 5 and 6. As shown in FIG. 5, the upper surface 37 of a radially extending spoke 35 may incline toward the substantially planar surfaces 36 of the cutting face 26 in a direction toward the central axis 54. In other words, the upper surface 37 of the radially extending spoke 35 may extend from the substantially planar surface 36 near the central axis 54 radially outward, away from the central axis 54, away from the substantially planar surface 36. As such, the radially extending spoke 35 may not extend completely across an indentation 34 to a periphery of the diamond table 24.

As shown in FIG. 6, the upper surface 37 of a radially extending spoke 35 may decline away from the substantially planar surface 36 of the cutting face 26 in a direction toward the central axis 54. In other words, the upper surface 37 of the radially extending spoke 35 may extend from the substantially planar surface 36 near a periphery of the diamond table 24 radially inward, toward the central axis 54, away from the substantially planar surface 36. As such, the radially extending spoke 35 may not extend completely across an indentation 34 to the center of the diamond table 24.

Figure 7:
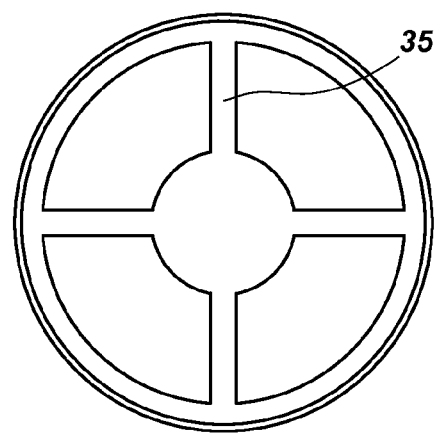
FIG. 7 is a plan view of the cutting element of FIGS. 1-4.

As shown in FIGS. 3 and 7, each radially extending spoke 35 may have a substantially uniform circumferential width along a radially extending length. However, in additional embodiments, the circumferential width of a radially extending spoke 35 may vary along a radially extending length, as shown in FIGS. 8-11.

Figure 8:
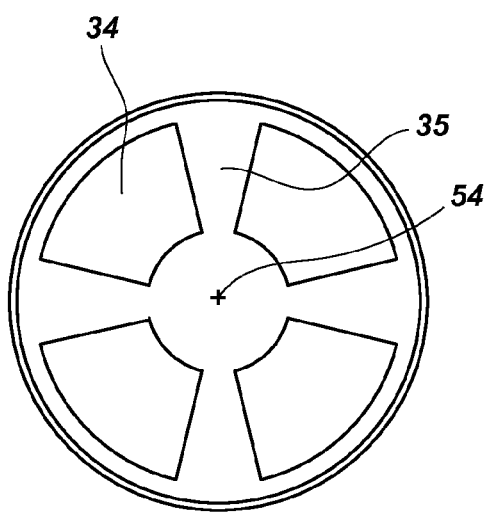
FIG. 8 is a plan view of a cutting element including radial spokes that widen as the radial spokes extend away from a center of the cutting element, according to an embodiment of the present disclosure.
Figure 9:
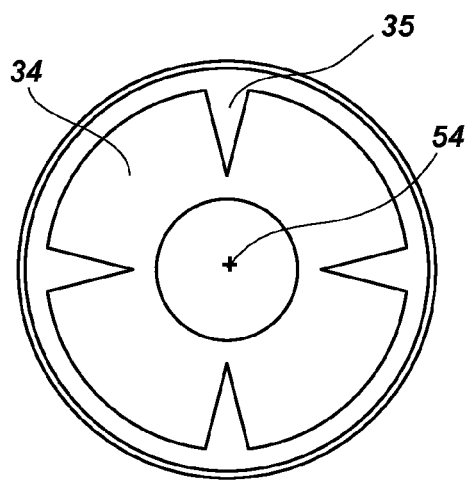
FIG. 9 is a plan view of a cutting element including radial spokes that widen as the radial spokes extend away from a center of the cutting element, and that do not extend all the way to the center of the cutting element, according to an embodiment of the present disclosure.

As shown in FIGS. 8 and 9, the circumferential width of a radially extending spoke 35 may decrease in size along a radially extending length as it extends toward the central axis 54. In such embodiments, each radially extending spoke 35 may extend completely across an indentation 34, from the periphery to the central region proximate the central axis 54, as shown in FIG. 8. In further embodiments, each radially extending spoke 35 may extend only partially across an indentation 34, as shown in FIG. 9.

Figure 10:
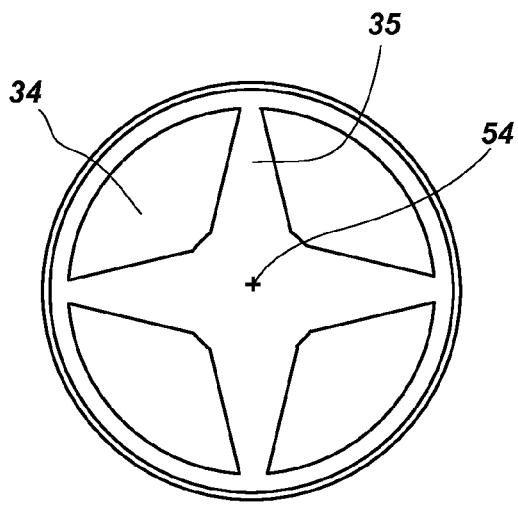
FIG. 10 is a plan view of a cutting element including radial spokes that widen as the radial spokes extend toward a center of the cutting element, according to an embodiment of the present disclosure.
Figure 11:
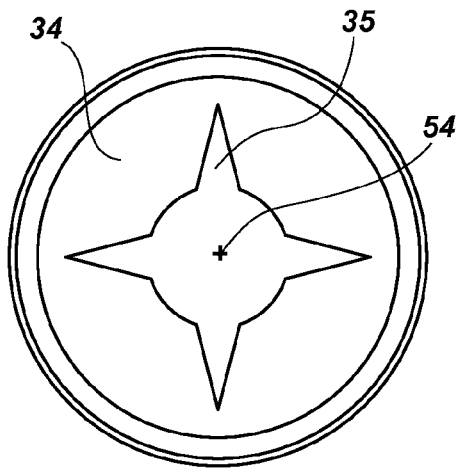
FIG. 11 is a plan view of a cutting element including radial spokes that widen as the radial spokes extend toward a center of the cutting element, and that do not extend all the way to a periphery of the cutting element, according to an embodiment of the present disclosure.

As shown in FIGS. 10 and 11, the circumferential width of a radially extending spoke 35 may increase in size along a radially extending length as it extends toward the central axis 54. In such embodiments, each radially extending spoke 35 may extend completely across an indentation 34, from the periphery to the central region proximate the central axis 54, as shown in FIG. 10. In further embodiments, each radially extending spoke 35 may extend only partially across an indentation 34, as shown in FIG. 11.

Although embodiments of cutting elements 20 described with reference to FIGS. 1-11 are shown with four radially extending spokes 35, different numbers of radially extending spokes 35 may be utilized in further embodiments. Additionally, although embodiments of cutting elements 20 described with reference to FIGS. 1-11 are shown having radially extending spokes 35 distributed evenly around the circumference of the cutting element 20, radially extending spokes 35 may be distributed unevenly around a circumference in further embodiments.

In some embodiments, the path that the indentations 34 extend along may be defined by additional shapes, rather than a path configured as an annulus or a circle. For example, the indentations 34 may extend along a path shaped generally as a polygon, such as a generally triangular path, as shown in FIG. 12. For another example, the indentations 34 may extend along a path generally shaped as a regular n-sided polygon, where n may have any value from three (3) to infinity, whereby n equal to infinity is equivalent to the aforementioned circular embodiment.

In additional embodiments, the path that the indentation 34 extends along may be generally shaped as a Reuleaux polygon (i.e., a curvilinear polygon built up of circular arcs), such as a path shaped generally as a Reuleaux triangle, as shown in FIG. 13.

In yet additional embodiments, a transverse cross-sectional shape of the indentation 34 taken across a segment thereof may be defined by further shapes, in addition to a circular arc. For example, a cross-section of the indentation 34 may be generally defined as one or more of an elliptical arc (FIG. 14), a symmetric curved shape, an asymmetric curved shape, a symmetric V-shape (FIG. 15), and an asymmetric V-shape (FIG. 16).

Each indentation 34 may be formed in the diamond table 24 after the diamond table 24 has been formed, such as by using at least one of electrical discharge machining (EDM) and laser machining (e.g., laser ablation, laser drilling, laser shaping, etc.), to achieve a desired shape, depth, and cross-sectional configuration by using electrical discharges from an electrode (not shown). In some embodiments, the diamond table 24 may be moved relative an electrode having a shape of a desired cross-section of the indentation 34 (and/or the electrode may be moved along a desired path relative to the diamond table 24) to form the indentation 34. For example, to form the indentations 34 using EDM, an electrode having an arcuate shape may be lowered into the cutting face 26 of the diamond table 24, and then the diamond table 24 may be rotated to form an indentation 34 comprising an arcuate groove following an annular path. The electrode may be removed from the cutting face 26 as the diamond table 24 is rotated along selected segments to provide radially extending spokes 35. In additional embodiments, an electrode die having a negative shape of each desired indentation 34 (i.e., one or more protrusions), may be sunk into the cutting face 26 of the diamond table 24 to form each indentation 34. To form the indentations 34 using laser machining, a high energy laser may be directed at portions of the cutting face 26 to be removed. The laser may locally heat the PCD material of the diamond table 24 to a temperature sufficient to melt, vaporize, and remove material from the diamond table 24 to form at least a portion of the indentations 34.

Figure 17:
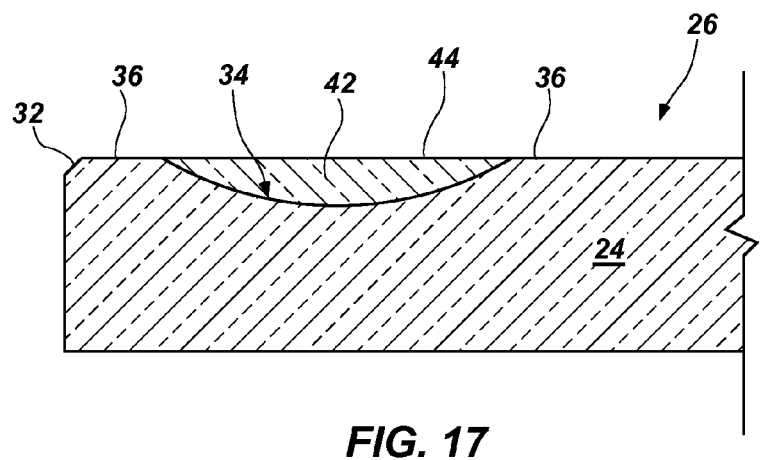
FIG. 17 is a cross-sectional view of a portion of a superabrasive table of a cutting element having an indentation substantially filled with a sacrificial structure, according to an embodiment of the present disclosure.
Figure 18:
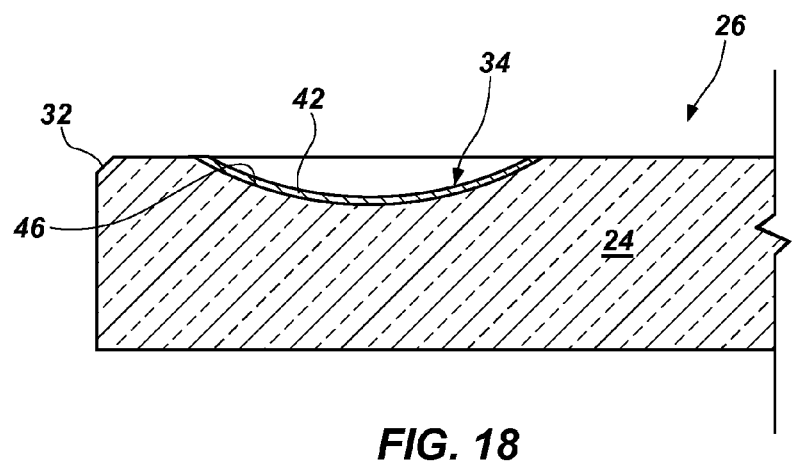
FIG. 18 is a cross-sectional view of a portion of a superabrasive table of a cutting element with a relatively thin sacrificial structure positioned over a surface of an indentation, according to an embodiment of the present disclosure.

In some embodiments, each indentation 34 in the diamond table 24 may include a sacrificial structure 42 positioned therein, as shown in FIGS. 17 and 18. For example, each sacrificial structure 42 may substantially fill each corresponding indentation 34 in the diamond table 24, such that a surface 44 of each sacrificial structure 42 may be substantially aligned and coplanar with the adjacent, substantially planar surfaces 36 of the cutting face 26 of the diamond table 24, as shown in FIG. 17. In another example, the sacrificial structure 42 may be a relatively thin material layer positioned over a surface 46 of the indentation 34, as shown in FIG. 18. In some embodiments, the sacrificial structure 42 may be comprised of a material that is softer than the diamond table 24, or that is otherwise more susceptible to wear than the diamond table 24, such as one or more of a ceramic, a cermet, and a refractory metal. For example, the material of the sacrificial structure 42 may be one or more of tungsten carbide, aluminum oxide, tungsten, niobium, tantalum, hafnium, molybdenum, and carbides formed therefrom.

In such embodiments, each indentation 34 may be formed into the diamond table 24 during the formation of the diamond table 24. For example, one or more sacrificial structures 42 may be positioned within a mold and powdered precursor material comprising diamond particles may be positioned over (e.g., around) each sacrificial structure 42. Then the powdered precursor material may be compacted and sintered in the presence of a catalyst mixed with the diamond particles or swept from an adjacent substrate in a high-pressure, high-temperature (HPHT) process, as known to those of ordinary skill in the art, to form the diamond table 24, with each sacrificial structure 42 forming a corresponding indentation 34 in the diamond table 24. Each sacrificial structure 42, or a portion thereof, may then be removed, such as by sandblasting, machining, acid leaching, laser machining, or another process, or each sacrificial structure 42, or a portion thereof, may remain positioned in each indentation 34 to be removed by contact with a subterranean formation during drilling operations. Additionally, for embodiments wherein each sacrificial structure 42, or a portion thereof, may then be removed, such as by sandblasting, machining, acid leaching, laser machining, or another process, the diamond table 24 may be machined, such as by an EDM process or by a laser machining process, to a final geometry.

In some embodiments, the sacrificial structure 42 may be positioned within each indentation 34 in the diamond table after the indentation 34 is formed therein, such as after an HPHT process. For example, the sacrificial structure 42 may comprise one or more of a polymer, a glass, a ceramic, a cermet, a refractory metal, and a combination thereof that may be positioned within a corresponding indentation 34 of the diamond table 24. In view of this, the cutting face 26 of the cutting element 20 may appear substantially planar in an unused state, with one or more sacrificial structures 42 positioned therein. Each sacrificial structure 42 may wear away and each indentation 34 may become exposed for engagement with a formation during a drilling operation.

In further embodiments, a powder preform, such as a diamond-comprising powder contained in a cylindrical niobium cup, may be positioned adjacent a shaped mold, such as a mold having one or more shaped protrusions, during at least a portion of the sintering process. For example, the powder preform may be positioned adjacent the shaped mold during an HPHT process and a shape imparted by the shaped mold may be retained throughout a sintering cycle to form each indentation 34 in the diamond table 24. In further embodiments, the shape imparted by the mold may be near a desired net shape of each indentation 34, and the final shape of each indentation 34 may be machined, such as by an EDM process, to a final geometry.

In some embodiments, any combination of the techniques described herein may be used to form the indentations 34 in the diamond table 24. For example, an EDM process may be used to remove a portion of material from the diamond table 24, followed by a laser machining process to remove additional material from the diamond table 24 to form the indentations 34. By way of another non-limiting example, a sacrificial structure 42 may be used to form a portion of each indentation 34, as described above. The sacrificial structure 42 may then be removed, and a remainder of each indentation 34 may be formed by removing additional material from the diamond table 24 using one or more of EDM and laser machining, for example. Although not specifically addressed herein for the sake of brevity, additional combinations of techniques for forming the indentations 34 in the diamond table 24 are also contemplated and encompassed by the present disclosure.

Optionally, the catalyst material may be removed from the hard polycrystalline material of the diamond table 24 after the HPHT process, as known in the art. For example, a leaching process may be used to remove catalyst material from interstitial spaces between the inter-bonded grains of the hard polycrystalline material of the diamond table 24. By way of example and not limitation, the hard polycrystalline material may be leached using a leaching agent and processes such as those described more fully in, for example, U.S. Pat. No. 5,127,923 to Bunting et al., (issued Jul. 7, 1992), and U.S. Pat. No. 4,224,380 to Bovenkerk et al., (issued Sep. 23, 1980), the disclosure of each of which patent is incorporated herein in its entirety by this reference. Specifically, aqua regia (a mixture of concentrated nitric acid ($HNO_3$) and concentrated hydrochloric acid (HCl)) may be used to at least substantially remove catalyst material from the interstitial spaces between the inter-bonded grains in the hard polycrystalline material of the diamond table 24. It is also known to use boiling hydrochloric acid (HCl) and boiling hydrofluoric acid (HF) as leaching agents. One particularly suitable leaching agent is hydrochloric acid (HCl) at a temperature of above 110° C., which may be provided in contact with the hard polycrystalline material of the diamond table 24 for a period of about two hours to about 60 hours, depending upon the size of the body comprising the hard polycrystalline material. After leaching the hard polycrystalline material, the interstitial spaces between the inter-bonded grains within the hard polycrystalline material may be at least substantially free of catalyst material used to catalyze formation of inter-granular bonds between the grains in the hard polycrystalline material. In some embodiments, leaching may be selectively applied to specific regions of the diamond table 24, and not to other regions. For example, in some embodiments, a mask may be applied to a region of the diamond table 24, such as each indentation 34 or a region of one or more indentations 34 in the diamond table 24, and only the unmasked regions may be leached.

Additionally, an outer surface of the diamond table 24 may be physically modified, such as by polishing to a smooth or mirrored finish. For example, an outer surface of the diamond table 24 may have a reduced surface roughness, such as described in U.S. Pat. No. 6,145,608, which issued on Nov. 14, 2000 to Lund et al., and is assigned to the assignee of the present application; U.S. Pat. No. 5,653,300, which issued Aug. 5, 1997 to Lund et al., and is assigned to the assignee of the present application; and U.S. Pat. No. 5,447,208, which issued Sep. 5, 1995 to Lund et al., and is assigned to the assignee of the present application, the disclosure of each of which is incorporated herein in its entirety by this reference.

In conventional PCD cutting elements, a cutting face or leading face of PCD might be lapped to a surface finish of 20 μin. (about 0.508 μm) to 40 μin. (about 1.02 μm) root mean square ("RMS," all surface finishes referenced herein being RMS), which is relatively smooth to the touch and visually planar (if the cutting face is itself flat), but which includes a number of surface anomalies and exhibits a degree of roughness which is readily visible to one even under very low power magnification, such as a 10× jeweler's loupe. However, an exterior surface of the diamond table 24 may be treated to have a greatly reduced surface roughness. As a non-limiting example, an exterior surface of the diamond table 24 may be polished a surface roughness of about 0.5 μin. (about 0.0127 μm) RMS.

In some embodiments, the surface roughness of a surface of the diamond table 24 may be reduced by lapping of the cutting face 26 on conventional cast iron laps known in the art by using progressively smaller diamond grit suspended in a glycol, glycerine, or other suitable carrier liquid. The lapping may be conducted as a three-step process commencing with a 70-μm grit, progressing to a 40-μm grit, and then to a grit of about 1 μm to about 3 μm in size. In contrast, standard lapping techniques for a PCD cutting element, which may follow an initial electrodischarge grinding of the cutting face, finish lapping in one step with 70-μm grit. By way of comparison of grit size, 70-μm grit is generally of the consistency of fine sand or crystalline material, while 1 μm to 3 μm grit is generally similar in consistency to powdered sugar.

In additional embodiments, the surface roughness of a surface of the diamond table 24 may be reduced by placing the surface in contact with a dry, rotating diamond wheel. For example, the Winter RB778 resin bonded diamond wheel, offered by Ernst Winter & Son, Inc., of Travelers Rest, S.C., may be utilized. It may be important that the wheel be cooled as the diamond wheel is of resin-bonded construction. Elevated temperatures may result in the destruction of the wheel. The nature of the polishing process may require that the abrasive surface be kept dry. However, the wheel may be moistened with water at the start of the polishing process to reduce drag and facilitate proper orientation of the diamond table 24 against the wheel. In addition, a temperature range wherein polishing may be effected may be between about 140° F. (about 60° C.) and about 220° F. (about 104° C.). While specific polishers employed may rotate at about 3500 rpm, it is believed that a range between about 3000 rpm and about 5000 rpm would likely be adequate. About 2 lb. force (about 0.9 Kg) to about 8 lb. force (about 3.6 Kg) may be applied to the diamond table 24 against the wheel. As noted, the finish of an exterior surface of the diamond table 24 may be smoothed to about 0.5 μin. (about 0.0127 μm) RMS or less surface finish roughness approaching a true "mirror" finish. It may take about fifty minutes to about an hour of polishing with the aforementioned diamond wheel to achieve this finish on a surface of a one-half inch (about 1.27 cm) diameter diamond table 24, and about one and one-half hours to about two hours for a nominal three-quarter inch (about 1.905 cm) diameter diamond table 24. This same method described for polishing a face of the diamond table 24 may also be applied to polish the chamfer surface 32, as well as the side of the diamond table 24. To polish such surfaces, the diamond table 24, held by the substrate 22, is disposed at the desired angle to the rotating wheel. The cutting element 20 may then be rotated about an axis of symmetry to smooth and polish the chamfer surface 32 or other side areas of the diamond table 24. Thus, one could smooth and polish a curved, ridged, waved or other cutting face of a diamond table 24 to remove and reduce both large and small asperities, resulting in a mirror finish cutting face, which nonetheless is not flat in the absolute sense.

The cutting element cutting surfaces (cutting face, chamfer, side, etc.) may be polished by other methods, such as by using ion beams or chemicals, although the inherently inert chemical nature of diamond may make the latter approach somewhat difficult for diamond.

While an industry-standard PCD or other superhard cutting element may have a lapped surface finish on the cutting face with irregularities or roughness (measured vertically from the surface) on the order of 20 μin. (about 0.508 μm) to 40 μin.

(about 1.02 µm) RMS, as a result of the above-described polishing, some embodiments may have a diamond table 24 surface roughness between about 0.3 µin. (about 0.00762 µm) RMS and about 0.5 µin. (about 0.0127 µm) RMS. Additional embodiments may have a diamond table 24 surface roughness between about 0.4 µin. (about 0.0102 µm) RMS and about 0.6 µin. (about 0.0152 µm) RMS. In yet additional embodiments, the diamond table 24 may have a surface roughness less than about 10 µin. (about 0.254 µm) RMS. In further embodiments, the diamond table 24 may have a surface roughness less than about 2 µin. (about 0.0508 µm) RMS. In yet further embodiments, the diamond table 24 may have a surface roughness less than about 0.5 µin. (about 0.0127 µm) RMS, approaching a true "mirror" finish. The foregoing surface roughness measurements of the diamond table 24 may be measured using a calibrated HOMMEL® America Model T-4000 diamond stylus profilometer contacting the surface of the diamond table 24.

In view of the foregoing, selected surfaces of the diamond table 24 may be polished or otherwise smoothed to have a reduced surface roughness. In some embodiments, the substantially planar surfaces 36 of the cutting face 26 may have a reduced surface roughness. In further embodiments, the surface of each indentation 34 may have a reduced surface roughness. In yet further embodiments, the entire cutting face 26 of the diamond table 24 may have a reduced surface roughness. In additional embodiments, the chamfer surface 32 and/or other side surfaces of the diamond table 24 may have a reduced surface roughness. In yet additional embodiments, all of the exposed surfaces of the diamond table 24 may have a reduced surface roughness.

Figure 21:
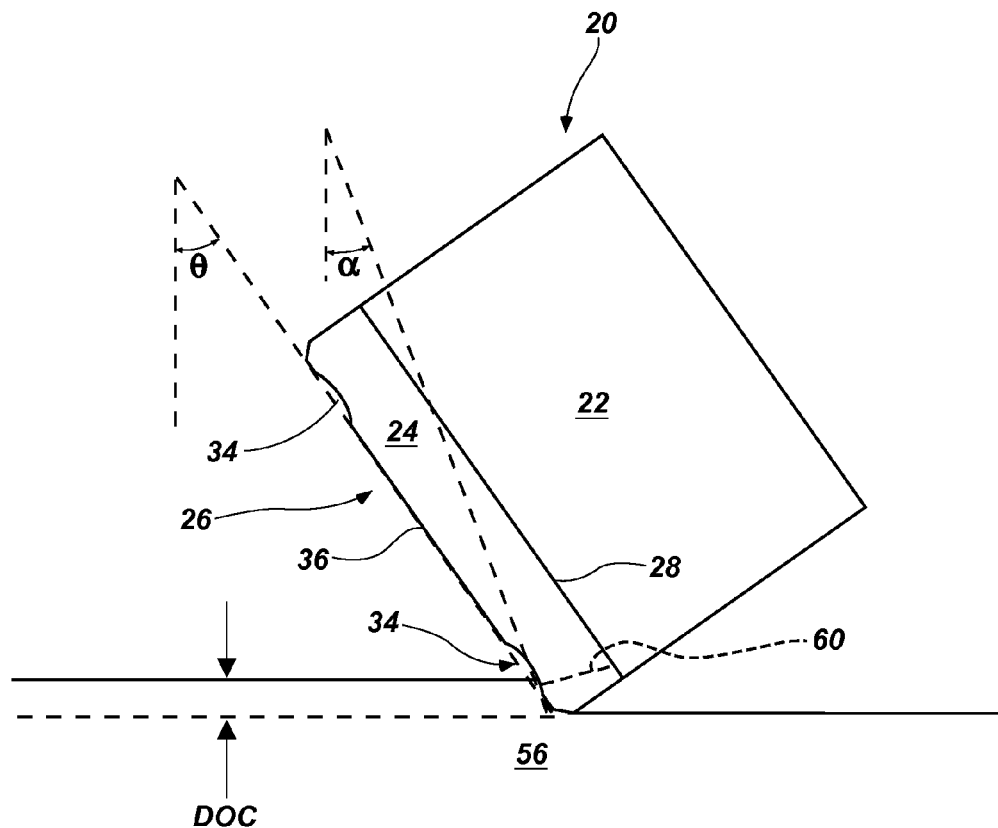
FIG. 21 is a schematic view of a cutting element having an indentation in a cutting face of a superabrasive table interacting with a formation during drilling operations, according to an embodiment of the present disclosure.

Referring now to FIG. 21, drilling forces caused by interaction between a formation 56 and the indentation 34 may exacerbate or amplify stress concentrations within the diamond table 24 above that of an otherwise similar PCD cutter without an indentation feature. For example, stress concentrations may occur in region 60, indicated by a dashed line in FIG. 21, which may result in a fracturing of the diamond table 24 at or near region 60 if the diamond table 24 is not properly reinforced at or near that location. Such reinforcement of the diamond table 24 at regions with an indentation 34 may be provided by one or more radially extending spokes 35 as described herein. By positioning one or more radially extending spokes 35 at or near locations that may experience relatively high stress during drilling operations, the radially extending spokes 35 may provide sufficient support to prevent or reduce fracturing of the diamond table 24 that might otherwise occur. In view of this, the size, shape, and location of the radially extending spokes 35, and the number of radially extending spokes 35 included on a diamond table 24, may be selected according to the position, size, and shape of the indentations 34 in the diamond table 24 and the anticipated forces that may be present during drilling operations.

Figure 19:
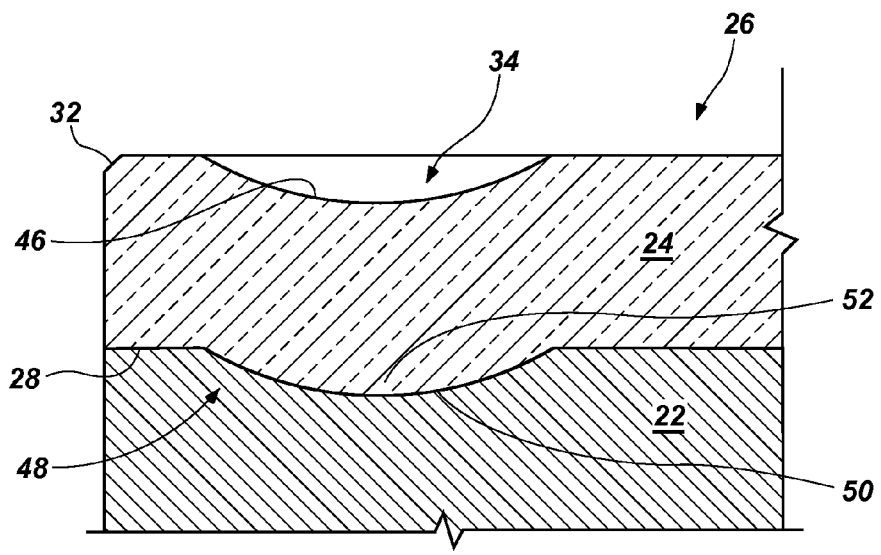
FIG. 19 is a cross-sectional view of a portion of a cutting element with a shaped region at an interface between a superabrasive table and a substrate corresponding to a shape of an indentation in a cutting face of the superabrasive table, according to an embodiment of the present disclosure.
Figure 20:
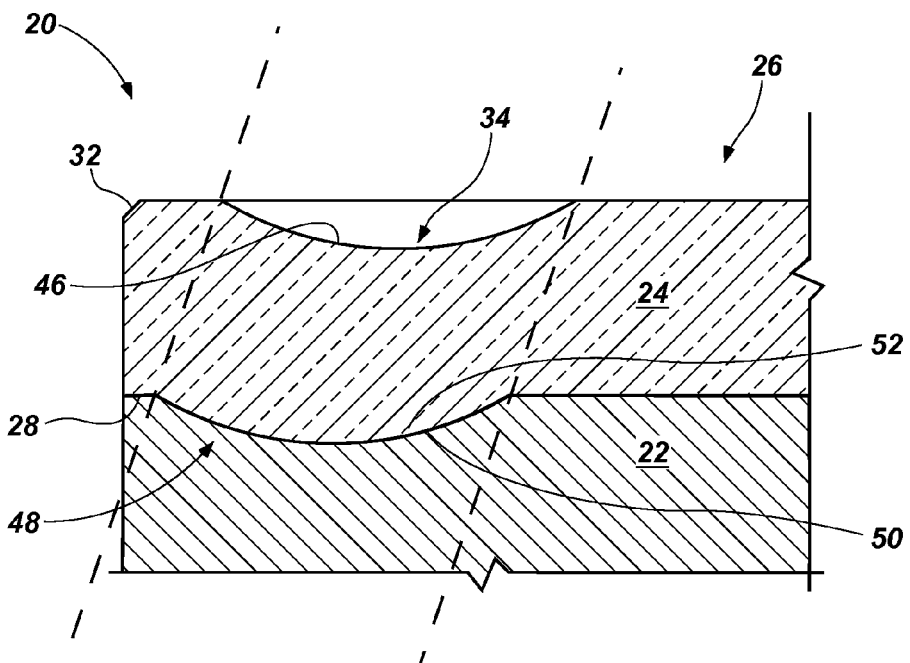
FIG. 20 is a cross-sectional view of a portion of a cutting element with a shaped region at an interface between a superabrasive table and a substrate corresponding to a shape of an indentation in a cutting face of the superabrasive table, the shaped region at the interface positioned radially outward of the indentation, according to an embodiment of the present disclosure.

Additionally, a shape of the interface 28 between the diamond table 24 and the substrate 22 of the cutting element 20 may be configured to effectively distribute stresses caused by cutting forces in and around the indentation 34 in the diamond table 24, to improve the structural integrity of the cutting element 20, as shown in FIGS. 19 and 20. For example, a shaped region 48 corresponding to a shape of the indentation 34 in the cutting face 26 of diamond table 24 may define a region of the interface 28, such as shown in FIG. 19. In some embodiments, the shaped region 48 of the interface 28 may be defined by an indentation 50 in the substrate 22 and a protrusion 52 (FIGS. 19 and 20) of the diamond table 24 at the interface 28. In view of this, the shaped region 48 of the interface 28 may provide a generally uniform thickness of the diamond table 24. In some embodiments, the shaped region 48 of the interface 28 corresponding to the indentation 34 in the diamond table 24 may be positioned directly, longitudinally, below the indentation 34 in the diamond table 24, as shown in FIG. 19. In further embodiments, at least a portion of the shaped region 48 of the interface 28 corresponding to the indentation 34 in the diamond table 24 may underlie the indentation 34 at a position radially inward (not shown) of the indentation 34 relative to a longitudinal axis 54 (FIG. 2) of the cutting element 20. In additional embodiments, at least a portion of the shaped region 48 of the interface 28 corresponding to the indentation 34 in the diamond table 24 may underlie the indentation 34 at a position radially outward of the indentation 34 relative to a longitudinal axis 54 (FIG. 2) of the cutting element 20, as shown in FIG. 20. Such a configuration may account for a projected direction of travel of the cutting element 20 relative to a formation (as indicated by the dashed lines in FIG. 20), as this may correspond to a primary general direction of cutting forces applied to the cutting element 20 during drilling operations. In other words, the shaped region of the interface 28 may be sized, shaped, and positioned to reduce stress concentrations, and/or to provide sufficient structural strength to withstand anticipated stress concentrations, that may result from drilling operations. Furthermore, a diamond layering composition of the diamond table 24 may be tailored in the shaped region 48 to compensate for residual stresses and provide a tailored material property of the diamond table 24, such as a tailored strength and toughness, in the shaped region 48.

In top-hole drilling operations, the geometry of the cutting element 20 may provide improved aggressiveness for a given depth-of-cut (DOC). When drilling in relatively soft formations at high DOCs, increases in aggressivity can be achieved with the cutting elements 20 described herein, while maintaining standard back-rakes, which can increase durability and longevity of the cutting elements 20. As a non-limiting example, a DOC up to about 0.15 inch (about 3.8 mm) may be targeted in a drilling operation, such as shown in FIG. 21. The region of the formation 56 that contacts the indentation 34 in the cutting face 26 of the diamond table 24 of the cutting element 20 may contact the cutting element 20 at an angle α different than an angle θ of the substantially planar surfaces 36 of the cutting face 26. In view of this, the effective rake angle α of the cutting element 20 taken at the indentation 34 may be less than the backrake angle θ of the cutting element 20 taken at the substantially planar surfaces 36 of the cutting face 26, thus resulting in increased aggressivity. Furthermore, a design of a single bit body 11 (FIG. 1) may be combined with different cutting element 20 designs to provide fixed-cutter rotary drill bits 10 having the same bit body 11 design, yet having various effective rake angles α. For example, a first earth-boring drill bit having a first bit body may include cutting elements having a substantially planar cutting element face with no indentation formed therein and have a first effective rake angle θ. A second earth-boring drill bit having a second bit body, having the same design as the first bit body, may include cutting elements having indentations in the face of the cutting element, as described herein, and may have a second effective rake angle α, different than the first effective rake angle θ of the first bit. In view of this, by varying the geometry and position of the indentation, the effective rake angle α and aggressiveness of a cutting element 20 may be varied, without a change in bit body 11 design.

In some embodiments, a DOC-limiting feature on an earth-boring tool may be positioned to facilitate interaction between an uncut earth formation and an indentation 34 in the cutting face 26 of the diamond table 24 during earth-boring operations. For example, the DOC-limiting feature on an earth-boring tool may be one or more of an outer surface of a blade 12 of the drill bit 10 shown in FIG. 1 and a bearing block feature, as described in U.S. patent application Ser. No. 12/766,988, filed Apr. 26, 2010, for "BEARING BLOCKS FOR DRILL BITS, DRILL BIT ASSEMBLIES INCLUDING BEARING BLOCKS AND RELATED METHODS," the disclosure of which is incorporated herein in its entirety by this reference. For example, the DOC-limiting feature may be positioned to be aligned with the deepest portion of the indentation 34 in the cutting face 26 of the diamond table 24. As the cutting element 20 may have a generally cylindrical shape and the indentation 34 may have a generally annular shape, it may be the deepest portion of the indentation 34 that extends the furthest from the body of the earth-boring tool (i.e., the portion that extends furthest from the blade 12 of the drill bit 10) that is aligned with the DOC-limiting feature. In view of this, uncut formation 56 may contact the cutting face 26 of the diamond table 24 well into the indentation 34 during drilling operations, such that the curved or angled surface of the indentation 34 positioned radially outward (relative to a primary axis of the cutting element 20) of the deepest portion of the indentation 34 may interact with the uncut formation 56 and provide a desired effective rake angle α.

Referring again to FIG. 1, the drill bit 10 may comprise a cone region 74, a nose region 76, a shoulder region 78, and a gage region 80. The cone region 74 may be a radially central portion of a face of the drill bit 10. The nose region 76 may be adjacent to the cone region 74 and radially outward relative to the cone region 74. The shoulder region 78 may be adjacent to the nose region 76 and radially outward relative to the nose region 74. The gage region 80 may be adjacent to the shoulder region 78 and radially outward relative to the shoulder region 78. Although FIG. 1 illustrates a drill bit 10 employing only cutting elements 20 having indentations 34 (FIGS. 2 and 3), the present disclosure is not so limited. Rather, some embodiments include drill bits having one or more conventional PCD cutting elements in addition to one or more cutting elements 20 having indentations 34. A conventional PCD cutting element may include a generally cylindrical PCD table defining a substantially planar cutting face that lacks the indentations 34 and/or spokes 35 described herein.

Cutting elements located in the cone and nose regions 74, 76, respectively, of a blade 12 may be exposed to a greater DOC in formation material relative to cutting elements located in other regions of the blade 12, but may be subjected to a lesser work rate than in other regions of the blade 12. Conversely, cutting elements located in the shoulder region 78 of the blade 12 may be exposed to a higher work rate, but a lesser DOC, than cutting elements in other regions of the blade 12. It is to be appreciated that cutting elements 20 having one or more indentations 34, as described herein, may be selectively located at specific regions of the blade 12 to tailor one or more performance characteristics. For example, in some embodiments (not shown), cutting elements 20, as described herein, may be selectively located in the cone region 74 and the nose region 76, and may be configured with one or more indentations 34 tailored for specific (e.g., high) DOC performance characteristics. Additionally, cutting elements 20, as described herein, may be selectively located in the shoulder region 78 of the blade 12, and may be configured with one or more indentations 34 tailored for specific (e.g., high) work rate performance characteristics. The gage region 80 of the blade 12 may be fitted with conventional PCD cutting elements. In additional embodiments (not shown), cutting elements 20 having one or more indentations 34, as described herein, may be selectively located in only one of the cone region 74, nose region 76, shoulder region 78, or gage region 80, while conventional PCD cutting elements may be located in the remaining regions. In yet other embodiments, cutting elements 20 having one or more indentations 34, as described herein, may be selectively located in any combination of the cone region 74, nose region 76, shoulder region 78, or gage region 80, with conventional PCD cutting elements located in the remaining regions of the blade 12. In some embodiments, one or more of the cone region 74, nose region 76, shoulder region 78, and gage region 80 may lack any cutting elements 20 having one or more indentations 34. Thus, one or more of the cone region 74, nose region 76, shoulder region 78, and gage region 80 may include only cutting elements 20 having one or more indentations 34, both cutting elements 20 having one or more indentations 34 and conventional PCD cutting elements, or only conventional PCD cutting elements.

In additional embodiments (not shown), cutting elements 20 having one or more indentations 34, as described herein, may be selectively located on one or more of the blades 12 of the drill bit 10. For example, a drill bit may be configured with cutting elements 20, as described herein, on alternating blades 12 of the drill bit, while the remaining blades 12 may be fitted with conventional PCD cutting elements. Benefits of such placement may include, among others, an improved balance of the aggressivity, stability, and steerablity of the drill bit 10. It is to be appreciated that, in further embodiments (not shown), cutting elements, such as cutting elements 20 described herein, may be selectively placed on specific blades and on specific regions of each specific blade to further tailor performance characteristics of the drill bit.

Additional non-limiting example embodiments of the present disclosure are set forth below.

Embodiment 1

A cutting element for an earth-boring tool, comprising: a superabrasive table positioned on a substrate; at least one indentation in a cutting face of the superabrasive table; and at least one spoke extending radially across at least a portion of the at least one indentation.

Embodiment 2

The cutting element of Embodiment 1, wherein the at least one spoke comprises an upper surface that is substantially coplanar with a substantially planar surface of the cutting face of the superabrasive table.

Embodiment 3

The cutting element of any one of Embodiments 1 and 2, wherein the at least one spoke comprises an upper surface that is angled relative to a substantially planar surface of the cutting face of the superabrasive table.

Embodiment 4

The cutting element of Embodiment 3, wherein the at least one spoke comprises an upper surface that inclines toward the cutting face in one of a direction radially toward a central axis of the superabrasive table and a direction radially away from the central axis of the superabrasive table

Embodiment 5

The cutting element of any one of Embodiments 1 through 4, wherein the at least one spoke comprises a circumferential width that varies along a radially extending length of the at least one spoke.

Embodiment 6

The cutting element of Embodiment 5, wherein the at least one spoke comprises a circumferential width that increases along a radially extending length of the at least one spoke in one of a direction away from a central axis of the superabrasive table and a direction toward the central axis of the superabrasive table.

Embodiment 7

The cutting element of any one of Embodiments 1 through 6, further comprising a shaped feature in the substrate at an interface between the superabrasive table and the substrate corresponding to the at least one indentation in the cutting face of the superabrasive table.

Embodiment 8

The cutting element of Embodiment 7, wherein the shaped feature in the substrate at the interface between the superabrasive table and the substrate comprises at least one indentation in the substrate having a shape similar to a shape of the at least one indentation in the cutting face of the superabrasive table.

Embodiment 9

The cutting element of Embodiment 8, wherein at least a portion of the at least one indentation in the substrate is positioned at least one of radially outward and radially inward of the at least one indentation in the cutting face of the superabrasive table relative to a longitudinal axis of the cutting element.

Embodiment 10

The cutting element of any one of Embodiments 1 through 9, wherein the at least one indentation extends along a path generally shaped as at least one of a circle, a polygon, and a Reuleaux polygon.

Embodiment 11

The cutting element of any one of Embodiments 1 through 10, wherein a cross-section of the at least one indentation in the cutting face of the superabrasive table taken perpendicular to the cutting face is generally shaped as one of a symmetric V-shape and an asymmetric V-shape.

Embodiment 12

The cutting element of any one of Embodiments 1 through 11, wherein the superabrasive table comprises a surface having a surface roughness less than about 10 μin. root mean square (RMS).

Embodiment 13

An earth-boring tool, comprising: at least one cutting element comprising: a superabrasive table positioned on a substrate; at least one indentation in a cutting face of the superabrasive table; and at least one spoke extending radially across at least a portion of the at least one indentation.

Embodiment 14

The earth-boring tool of Embodiment 13, further comprising a depth-of-cut limiting feature positioned on the earth-boring tool to facilitate interaction between uncut earth formation and the at least one indentation in the cutting face of the superabrasive table during earth-boring operations.

Embodiment 15

The earth-boring tool of any one of Embodiments 13 and 14, wherein the depth-of-cut limiting feature is aligned with a deepest portion of the at least one indentation in the cutting face.

Embodiment 16

A method of forming a cutting element, the method comprising: forming a superabrasive table having a cutting face, at least one indentation in the cutting face, and at least one spoke extending radially across at least a portion of the at least one indentation; and positioning the superabrasive table on a substrate.

Embodiment 17

The method of Embodiment 16, further comprising positioning a sacrificial structure within the at least one indentation.

Embodiment 18

The method of Embodiment 17, wherein positioning a sacrificial structure within the at least one indentation comprises: positioning the sacrificial structure within a mold; positioning powdered precursor material comprising superabrasive particles within the mold and over the sacrificial structure; and compacting the powdered precursor material.

Embodiment 19

The method of any one of Embodiments 17 and 18, wherein positioning a sacrificial structure within the at least one indentation comprises forming the sacrificial structure to have a surface that is substantially aligned and coplanar with an adjacent, substantially planar surface of the cutting face of the superabrasive table.

Embodiment 20

The method of any one of Embodiments 16 through 19, wherein forming a superabrasive table having a cutting face and at least one indentation in the cutting face comprises: forming the superabrasive table to have a cutting face comprising a substantially planar surface; and performing at least one of electrical discharge machining and laser machining the superabrasive table to form the at least one indentation in the cutting face.

Although the foregoing description contains many specifics, these are not to be construed as limiting the scope of the present disclosure, but merely as providing certain example embodiments. Similarly, other embodiments of the disclosure may be devised that are within the scope of the present invention. For example, features described herein with reference to one embodiment may also be combined with features of other embodiments described herein. The scope of the invention is, therefore, indicated and limited only by the appended claims and their legal equivalents, rather than by the foregoing description. All additions, deletions, and modifications to the invention, as disclosed herein, which fall within the meaning and scope of the claims, are encompassed by the present invention.

What is claimed is:

1. A cutting element for an earth-boring tool, comprising:
a superabrasive table positioned on a substrate;
at least one indentation in a cutting face of the superabrasive table; and
at least one spoke extending radially across at least a portion of the at least one indentation, wherein the entirety of at least one indentation is positioned radially inward from a substantially planar portion of the cutting face adjacent a cutting edge of the cutting face with respect to a longitudinal axis of the cutting element, and wherein an upper surface of the at least one spoke is substantially continuous with one or both of the substantially planar portion of the cutting face adjacent the cutting edge and a substantially planar central portion of the cutting face.

2. The cutting element of claim 1, wherein the upper surface of the at least one spoke is substantially coplanar with a substantially planar surface of the cutting face of the superabrasive table.

3. The cutting element of claim 1, wherein the upper surface of the at least one spoke is angled relative to a substantially planar surface of the cutting face of the superabrasive table.

4. The cutting element of claim 3, wherein the upper surface of the at least one spoke inclines toward the cutting face in one of a direction radially toward a central axis of the superabrasive table and a direction radially away from the central axis of the superabrasive table.

5. The cutting element of claim 1, wherein the at least one spoke comprises a circumferential width that varies along a radially extending length of the at least one spoke.

6. The cutting element of claim 5, wherein the at least one spoke comprises a circumferential width that increases along a radially extending length of the at least one spoke in one of a direction away from a central axis of the superabrasive table and a direction toward the central axis of the superabrasive table.

7. The cutting element of claim 1, further comprising a shaped feature in the substrate at an interface between the superabrasive table and the substrate corresponding to the at least one indentation in the cutting face of the superabrasive table.

8. The cutting element of claim 7, wherein the shaped feature in the substrate at the interface between the superabrasive table and the substrate comprises at least one indentation in the substrate having a shape similar to a shape of the at least one indentation in the cutting face of the superabrasive table.

9. The cutting element of claim 8, wherein at least a portion of the at least one indentation in the substrate is positioned at least one of radially outward and radially inward of the at least one indentation in the cutting face of the superabrasive table relative to a longitudinal axis of the cutting element.

10. The cutting element of claim 1, wherein the at least one indentation extends along a path generally shaped as at least one of a circle, a polygon, and a Reuleaux polygon.

11. The cutting element of claim 1, wherein a cross-section of the at least one indentation in the cutting face of the superabrasive table taken perpendicular to the cutting face is generally shaped as one of a symmetric V-shape and an asymmetric V-shape.

12. The cutting element of claim 1, wherein the superabrasive table comprises a surface having a surface roughness less than about 10 μin. root mean square (RMS).

13. An earth-boring tool, comprising:
at least one cutting element comprising:
a superabrasive table positioned on a substrate;
at least one indentation in a cutting face of the superabrasive table; and
at least one spoke extending radially across at least a portion of the at least one indentation, wherein the entirety of at least one indentation is positioned radially inward from a substantially planar portion of the cutting face adjacent a cutting edge of the cutting face with respect to a longitudinal axis of the cutting element, and wherein an upper surface of the at least one spoke is substantially continuous with one or both of the substantially planar portion of the cutting face adjacent the cutting edge and a substantially planar central portion of the cutting face.

14. The earth-boring tool of claim 13, further comprising a depth-of-cut limiting feature positioned on the earth-boring tool to facilitate interaction between uncut earth formation and the at least one indentation in the cutting face of the superabrasive table during earth-boring operations.

15. The earth-boring tool of claim 14, wherein the depth-of-cut limiting feature is aligned with a deepest portion of the at least one indentation in the cutting face.

16. A method of forming a cutting element, the method comprising:
forming a superabrasive table having a cutting face, at least one indentation in the cutting face, and at least one spoke extending radially across at least a portion of the at least one indentation, wherein the entirety of at least one indentation is positioned radially inward from a substantially planar portion of the cutting face adjacent a cutting-edge of the cutting face with respect to a longitudinal axis of the cutting element, and wherein an upper surface of the at least one spoke is substantially continuous with one or both of the substantially planar portion of the cutting face adjacent the cutting edge and a substantially planar central portion of the cutting face; and
positioning the superabrasive table on a substrate.

17. The method of claim 16, further comprising positioning a sacrificial structure within the at least one indentation.

18. The method of claim 17, wherein positioning a sacrificial structure within the at least one indentation comprises:
positioning the sacrificial structure within a mold;
positioning powdered precursor material comprising superabrasive particles within the mold and over the sacrificial structure; and
compacting the powdered precursor material.

19. The method of claim 17, wherein positioning a sacrificial structure within the at least one indentation comprises forming the sacrificial structure to have a surface that is substantially aligned and coplanar with an adjacent, substantially planar surface of the cutting face of the superabrasive table.

20. The method of claim 16, wherein forming a superabrasive table having a cutting face and at least one indentation in the cutting face comprises:

forming the superabrasive table to have a cutting face comprising a substantially planar surface; and
performing at least one of electrical discharge machining and laser machining the superabrasive table to form the at least one indentation in the cutting face.

* * * * *

UNITED STATES PATENT AND TRADEMARK OFFICE
CERTIFICATE OF CORRECTION

| | | |
|---|---|---|
| PATENT NO. | : 9,103,174 B2 | Page 1 of 1 |
| APPLICATION NO. | : 13/609575 | |
| DATED | : August 11, 2015 | |
| INVENTOR(S) | : Anthony A. DiGiovanni | |

It is certified that error appears in the above-identified patent and that said Letters Patent is hereby corrected as shown below:

In the claims:

CLAIM 16, COLUMN 18, LINES 43,44     change "adjacent a cutting-edge" to
--adjacent a cutting edge--

Signed and Sealed this
Fifth Day of January, 2016

Michelle K. Lee
*Director of the United States Patent and Trademark Office*